United States Patent Office 3,454,280
Patented July 8, 1969

3,454,280
GOLF BALLS HAVING COVERS OF ETHYLENE-UNSATURATED MONOCARBOXYLIC ACID CO-POLYMER COMPOSITIONS
Stanley R. Harrison, Castle Bromwich, near Birmingham, and Robert M. Broughton, Boldmere, Sutton Coldfield, England, assignors to Dunlop Rubber Company, Limited, London, England, a British company
No Drawing. Filed Feb. 2, 1966, Ser. No. 524,487
Claims priority, application Great Britain, Feb. 10, 1965, 5,693/65
Int. Cl. A63b 37/12
U.S. Cl. 273—235                8 Claims

ABSTRACT OF THE DISCLOSURE

A golf ball having a cover of a composition comprising a copolymer of ethylene and an unsaturated monocarboxylic acid. The copolymer may with advantage be a terpolymer of ethylene, an unsaturated monocarboxylic acid and a metal salt of an unsaturated monocarboxylic acid. Paints adhere satisfactorily to these compositions and they exhibit excellent cutting resistance.

---

This invention relates to golf balls and to a method for the manufacture of golf balls.

According to the present invention, a golf ball comprises a core and a cover for said core, said cover being formed of a composition comprising a copolymer of at least one mono-olefine and at least one unsaturated carboxylic acid copolymerizable therewith.

According to the invention also, a method for the manufacture of a golf ball comprises moulding on to a golf ball core a cover of a composition comprising a copolymer of at least one mono-olefine and at least one unsaturated carboxylic acid copolymerizable therewith.

The copolymers employed to form the covers of the golf balls of the present invention are copolymers of at least one olefine with at least one unsaturated carboxylic acid and can be either random copolymers in which the molecular chains are composed of the different monomers polymerized or can be graft copolymers made by polymerizing the unsaturated carboxylic acid monomer on to a backbone molecular chain of the polyolefine. The graft copolymers can be prepared by irradiation, e.g. gamma or ultraviolet radiation of the mixture of polyolefine and the unsaturated carboxylic acid. The copolymer may, if desired, contain small amounts, e.g. less than 10 percent by weight of other monomers such as vinyl alkanoic esters, alkyl acrylates and alkyl methacrylates.

Preferably, the olefine contains a small number of carbon atoms in the molecule and a particularly useful copolymer is prepared from ethylene. The unsaturated carboxylic acid can be a dicarboxylic acid but preferably is a monocarboxylic acid, for example acrylic acid, methacrylic acid, itaconic acid, crotonic acid and sorbic acid. Mixtures of different carboxylic acids can be used and metal salts of the acid in which the metal has a valency of from 1 to 4, e.g. sodium or zinc salts, can be used to form terpolymers with the olefin and a free acid. A typical polymer is a terpolymer of ethylene, methacrylic acid and sodium methacrylate.

The copolymers can contain up to 30 percent by weight of the unsaturated carboxylic acid but preferably contain up to 15 percent by weight. If a metal salt of an acid is used, the metal is usually present in an amount of from 10 to 75 percent, preferably 15 to 60 percent and particularly 20 to 50 percent of the stoichiometric equivalent of the carboxylic acid. The copolymers are thermoplastic and have a lower softening point than homopolymers of the olefine.

Preferably, the copolymers contain a number of thermolabile cross-linkages to increase the hardness and stiffness of the solid mixture so produced. This can be achieved by employing a terpolymer with a metal salt of the acid as described above, and/or a cross-linking agent can be introduced into the composition immediately prior to use for the manufacture of the cover of the golf ball or can be introduced some time previously, e.g. a metal salt can be reacted with the copolymer at elevated temperatures such that the volatiles are removed prior to use of the copolymer composition for the manufacture of the cover. The composition containing the thermolabile cross-linkages remains thermoplastic although the viscosity of the molten composition is greater than that of a composition which does not contain the thermolabile cross-linkages. The cross-linked composition has an increased hardness and toughness as compared to a non-cross-linked composition.

The cross-linking agent used to introduce the thermolabile cross-linkages into the copolymer composition is an inorganic or organic metal compound that allows the metal ions to become associated with the reactive carboxyl groups in the polymer and typical metal compounds are the acetates, oxides, carbonates and hydroxides. Preferably, mono- or divalent metal compounds are used, and examples of suitable compounds are the acetates of sodium and potassium, or the oxides of calcium, magnesium and zinc. Compounds of trivalent and tetravalent metals such as aluminium or lead may also be used.

The amount of cross-linking agent that is mixed with the copolymer is less than that theoretically required to react with all the acid groups in the copolymer and usually is less than 75 percent of stoichiometric equivalent of the carboxylic acid. Preferably, 15 to 60 percent, particularly 20 to 50 percent, of the stoichiometric equivalent of the carboxylic acid is used.

The composition used to form the cover of the golf ball can contain a filler which can be an active filler, i.e. one which acts as the cross-linking agent as well as the filler. In the case where an active filler is used then there is no need for an additional cross-linking agent to be employed, since a proportion of the filler acts in this way. Examples of active fillers are zinc oxide and magnesium oxide while an example of a substantially inactive filler is titanium dioxide. The incorporation of a filler improves the properties of the composition, particularly in regard to the cutting-resistance which is exceedingly important in connection with golf balls. The compositions containing the filler are still thermoplastic. The amount of filler that is mixed with the copolymer is usually from 10 percent to 20 percent of the weight of the copolymer, more usually about 18 percent by weight.

The golf ball of the present invention comprises a core having a cover formed from the copolymer composition. Conventionally, the core comprises a core-centre which can be either solid or a small spherical sac filled with a liquid or paste and having wound on the core-centre a layer of rubber thread or tape. In the manufacture of golf balls according to the present invention, the copolymer composition is prepared by mixing the copolymer with the filler and/or cross-linking agent on a mill or in an internal mixer at an elevated temperature, e.g. 120° C. to 150° C. When a cross-linking agent is employed then this is preferably mixed with the copolymer after the other ingredients have been mixed. The cross-linking agent is usually mixed at about 150° C. and allowed to react with the copolymer at this temperature for about 15 minutes. A convenient manner of manufacturing golf balls is to mould the copolymer composition after mixing with the other ingredients into half-shells, each shell being a hemispherically-shaped cup; two cups are then placed in a suitably sized mould enclosing a core and heated under pressure to cause the two half-shells to fuse and become securely locked to the core and to acquire the patterned surface usual with golf balls. During this moulding operation, it is important that the temperature required to soften the half-shells should not be sufficient to damage the core and thus the copolymer composition which is used should have a Vicat softening point of 80° C. or less. Preferably, the copolymer used in this method of manufacture of golf balls should be formed from ethylene with the unsaturated monocarboxylic acid.

The copolymer compositions used in the present invention in possessing the ability to be melted and solidified at any desired time by the application of heat, regardless of whether they are cross-linked or not, show an important advantage in that waste material arising during moulding of the golf balls can be re-used. Also, faulty golf balls caused by incorrect moulding can be re-moulded. Such advantages do not apply in relation to golf balls having covers formed from balata or homopolymers of ethylene cross-linked by irradiation or chemical means. In addition, the golf balls of the present invention can be painted without having to perform the complicated preliminary processes associated with the painting of homopolymers of ethylene and like materials. For instance, the need for oxidative treatment of the golf ball by corona discharge, chromic acid or ozone to obtain satisfactory paint adhesion to golf balls having covers of polyethylene is dispensed with.

The invention is illustrated in the following examples in which all parts are parts by weight. In the following examples, a number of terms and words have been abbreviated and a key to those abbreviations is given below:

HP=homopolymer
CP=copolymer
ZO=zinc oxide
TO=titanium dioxide
BA=Balata
SA=sodium acetate
CR=cutting resistance
HA=hardness (Shore C)
VI=Vicat softening point in ° C.

Example I

The following compositions denoted by A, B, C and D were prepared by mixing the ingredients specified in an internal mixer at a temperature of 120° C. to 150° C.:

| Ingredient | Parts by wt. | | | |
|---|---|---|---|---|
| | A | B | C | D |
| HP | 82 | 82 | | |
| CP | | | 82 | 82 |
| ZO | | 5 | | 5 |
| TO | 18 | 13 | 18 | 13 |

Compositions B and D were subsequently heated in the internal mixer for a further 15 minutes at 150° C.

The homopolymer was a high-pressure polyethylene having a molecular weight of 24,000 and a melt-flow index of 20 grammes per 10 minutes at 190° C. when measured according to ASTM D–1238–62T. The copolymer was a random copolymer of ethylene and acrylic acid having a melt-flow index of 20.3 grammes per 10 minutes containing 14 percent by weight of acrylic acid.

A further composition denoted by E was prepared by mixing together the following ingredients:

| Ingredient: | E, parts by wt. |
|---|---|
| Balata | 60.0 |
| Crepe rubber | 25.0 |
| Titanium dioxide | 10.0 |
| Zinc oxide | 3.0 |
| Sulphur | 1.0 |
| Secondary amine accelerator | 0.5 |

Small test slabs each having a size 3 inches x 1 inch x 0.125 inch of Compositions A, B, C, D and E were moulded at 100° C., allowed to cool and their cutting-resistance, Shore hardness and Vicat softening points were determined. These are listed below in Table I with results for a slab of Composition E which had been cured by exposure to carbon disulphide vapour for one day followed by heating at 40° C. for 4 days in the absence of carbon disulphide. This cured sample is denoted by F.

TABLE I

| | A | B | C | D | E | F |
|---|---|---|---|---|---|---|
| CR | 305 | 305 | 305 | 460 | 275 | 300 |
| HA | 82 | 82 | 82 | 91 | 75 | 80 |
| VI | 83 | 83 | 66 | 70 | 48 | |

Golf ball covers were manufactured from Compositions A, B, C, D and E by moulding half-shells of the respective compositions on to standard thread-wound ball cores. Golf balls having covers manufactured from Composition E were cured by exposure to carbon disulphide vapour as described above.

Satisfactory, playable golf balls resulted from the use of Compositions C, D and E whereas those having covers formed from A or B were either damaged due to excessive moulding temperatures being required to flux the composition or the balls had faulty seam-lines and poor embedment to the core as a result of the use of low moulding temperatures to combat the first defect.

Golf balls having covers formed from Composition D had a superior cutting-resistance to the others.

Example II

Two compositions, G and H, were prepared by mixing the following ingredients in an internal mixer at a temperature of 120° C. to 150° C.:

| Ingredients | Parts by wt. | |
|---|---|---|
| | G | H |
| CP | 82 | 82 |
| ZO | | 5 |
| TO | 18 | 13 |

Composition H was subsequently heated in the internal mixer for a further 15 minutes at 150° C.

The copolymer was a random copolymer of ethylene and acrylic acid having a melt-flow index measured according to ASTM D–1238–62T of 1.7 grammes per 10 minutes at 190° C. and contained 9 percent by weight of acrylic acid of which half was in the form of the sodium salt.

Small test slabs each having a size of 3 inches x 1 inch x 0.125 inch were moulded at 100° C. from Compositions G and H. The properties of each composition are shown in Table II:

TABLE II

|    | G    | H   |
|----|------|-----|
| CR | 435  | 450 |
| HA | 84   | 90  |
| VI | 69.2 | 70  |

It will be seen that the compositions had an increased cutting-resistance when compared to Compositions A, B, E and F of Example I and a lower Vicat softening point when compared to Compositions A and B.

Golf balls were manufactured from Compositions G and H by moulding half-shells on to standard thread-wound cores. Satisfactory, playable golf balls resulted from the use of Compositions G and H and these were substantially better than those having covers formed from Composition E with regard to cutting-resistance, with golf balls having covers formed from Composition H being slightly better than golf balls having covers formed from Composition G.

Example III

The following compositions, denoted by I, J, K and L were prepared by mixing together the ingredients specified in an internal mixer at a temperature of 120° C. to 150° C.:

| Ingredients | Parts by wt. | | | |
|---|---|---|---|---|
| | I | J | K | L |
| HP | 100 | 95 | | |
| CP | | | 100 | 95 |
| ZO | | 5 | | 5 |

Composition L was subsequently heated in the internal mixer for a further 15 minutes at a temperature of 150° C.

The homopolymer was homopolyethylene having a molecular weight and melt-flow index as in Example I and the copolymer was an irradiation graft copolymer of ethylene and acrylic acid containing 8 percent by weight of acrylic acid having a melt-flow index of 6 grammes per 10 minutes.

Small test slabs of each composition were prepared as described in Examples I and II and their properties are shown in Table III:

TABLE III

|    | I   | J   | K   | L   |
|----|-----|-----|-----|-----|
| CR | 270 | 270 | 295 | 340 |
| HA | 78  | 78  | 78  | 84  |
| VI | 83  | 83  | 78  | 79  |

The Compositions K and L are suitable for the manufacture of covers for golf balls.

Example IV

Four compositions were prepared, M, N, O and P, based on an ethylene-methacrylic copolymer CP1, and two ethylene-acrylic acid copolymers CP2 and CP3 as defined below:

|     | M  | N  | O   | P  |
|-----|----|----|-----|----|
| CP1 | 82 |    |     |    |
| CP2 |    | 82 |     |    |
| CP3 |    |    | 82  | 82 |
| TO  | 18 | 16 | 16  | 18 |
| SA  |    |  8 | 4.5 |    |

Copolymer 1 was a random copolymer of ethylene and methacrylic acid having a melt-flow index according to ASTM D-1238-62T of 0.5 gramme per 10 minutes at 190° C. and contained 10 percent by weight of methacrylic acid of which half was in the form of the sodium salt.

Copolymer 2 was the random copolymer of ethylene and acrylic acid previously used in Example I.

Copolymer 3 was a random copolymer of ethylene and acrylic acid having a melt-flow index of 6.0 grammes per 10 minutes at 190° C. according to ASTM D-1238-62T and containing 8 percent acrylic acid. Compositions N and O were prepared by mixing the ingredients in an internal mixer at 120° C. to 150° C. and allowing the mix to react at 150° C. for 15 minutes during which time volatile acetic acid was allowed to escape.

Small test slabs having a size 3 inches x 1 inch x 0.125 inch were moulded at 100° C. from the compositions. The properties of each composition are shown in Table IV:

TABLE IV

|    | M   | N   | O   | P   |
|----|-----|-----|-----|-----|
| CR | 505 | 435 | 330 | 315 |
| HA | 86  | 91  | 81  | 87  |
| VI | 66  | 68  | 77  | 76  |

It will be seen that the compositions had an improved cutting-resistance when compared to Compositions A, B, E and F of Example I and a lower Vicat softening point compared to Compositions A and B.

Golf balls were manufactured from the four compositions by moulding half-shells on to standard thread-wound covers. Satisfactory, playable balls resulted and were flight tested. The properties of the golf balls from each composition are shown in Table V:

TABLE V

|                       | M    | N     | O    | P   |
|-----------------------|------|-------|------|-----|
| Total flight (yards)  | 238  | 242   | 244  | 238 |
| Total carry (yards)   | 218  | 217   | 218  | 213 |
| Trajectory            | 26.5 | 25.75 | 25.5 | 25  |

The cutting-resistances of Compositions M and N were excellent and those of Compositions O and P were good.

Having now described our invention—what we claim is:

1. A golf ball comprising a core and a cover, said cover being formed of a composition comprising a copolymer of ethylene and at least one unsaturated monocarboxylic acid containing from three to eight carbon atoms, said copolymer containing up to thirty percent by weight of said acid.

2. A golf ball according to claim 1, in which said monocarboxylic acid is selected from the group consisting of acrylic acid and methacrylic acid.

3. A golf ball according to claim 1,, in which said copolymer is a terpolymer of ethylene, said unsaturated monocarboxylic acid and a metal salt of an unsaturated monocarboxylic acid, said metal being present in an amount of from 10 to 75 percent of the stoichiometric equivalent of said monocarboxylic acid.

4. A golf ball according to claim 3, in which said metal has a valency of 1 to 4.

5. A golf ball according to claim 1, in which said composition contains a cross-linking agent selected from the group consisting of acetates, carbonates, hydroxides and oxides of monovalent metals, said cross-linking agent being present in an amount of from 15 percent to 60 percent of the stoichiometric equivalent of the carboxylic acid in the copolymer.

6. A golf ball according to claim 1, in which said composition contains a cross-linking agent selected from the group consisting of acetates, carbonates, hydroxides and oxides of divalent metals, said cross-linking agent being present in an amount of from 15 percent to 60 percent of the stoichiometric equivalent of the carboxylic acid in the copolymer.

7. A golf ball according to claim 1, in which said composition contains from 10 to 20 percent by weight of titanium dioxide as filler.

8. A golf ball according to claim 6, in which said cross-linking agent is selected from the group consisting of zinc oxide and magnesium oxide.

References Cited

UNITED STATES PATENTS

| | | | |
|---|---|---|---|
| 2,815,957 | 12/1957 | Semegen | 273—235 |
| 3,264,272 | 8/1966 | Rees | 260—80.5 |

FOREIGN PATENTS 911,147  11/1962  Great Britain.

OTHER REFERENCES

Plastic Materials, Brydson, J. A., D. Van Nostrand Company, Inc., Princeton, N.J.

MORRIS LIEBMAN, *Primary Examiner.*

S. L. FOX, *Assistant Examiner.*

U.S. Cl. X.R.

260—41; 273—218

UNITED STATES PATENT OFFICE
CERTIFICATE OF CORRECTION

Patent No. 3,454,280      Dated July 8, 1969

Inventor(s) Stanley R. HARRISON et al

It is certified that error appears in the above-identified patent and that said Letters Patent are hereby corrected as shown below:

Column 4, lines 69 and 72, in each instance for "acrylic" read --methacrylic--;

Column 5, line 43, for "an irradiation graft" read --a random--;

Column 6, line 3, for "half" read --somewhat more than half--;

Column 6, lines 3-4, for "sodium salt" read --zinc salt--.

Signed and sealed this 12th day of March 1974.

(SEAL)
Attest:

EDWARD M. FLETCHER, JR.
Attesting Officer

C. MARSHALL DANN
Commissioner of Patents